Sept. 3, 1946.   C. B. WATTS, JR   2,406,876
INSTRUMENT NAVIGATION SYSTEM
Filed May 29, 1942   4 Sheets-Sheet 1

INVENTOR
CHESTER B. WATTS, JR.
BY
Paul R. Adams
ATTORNEY

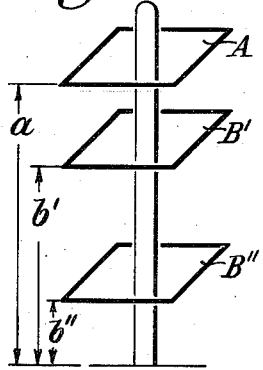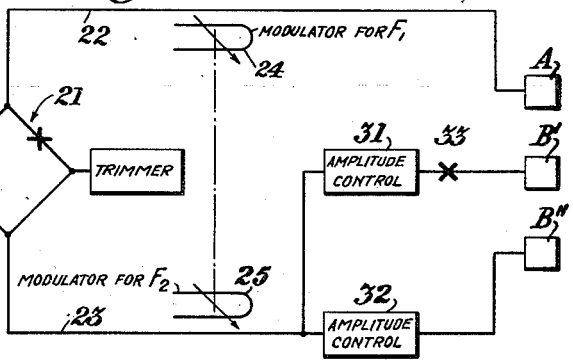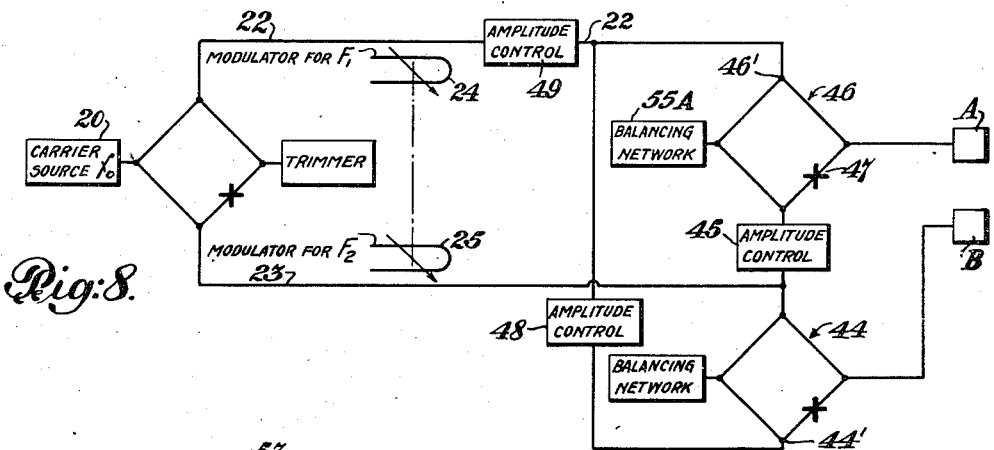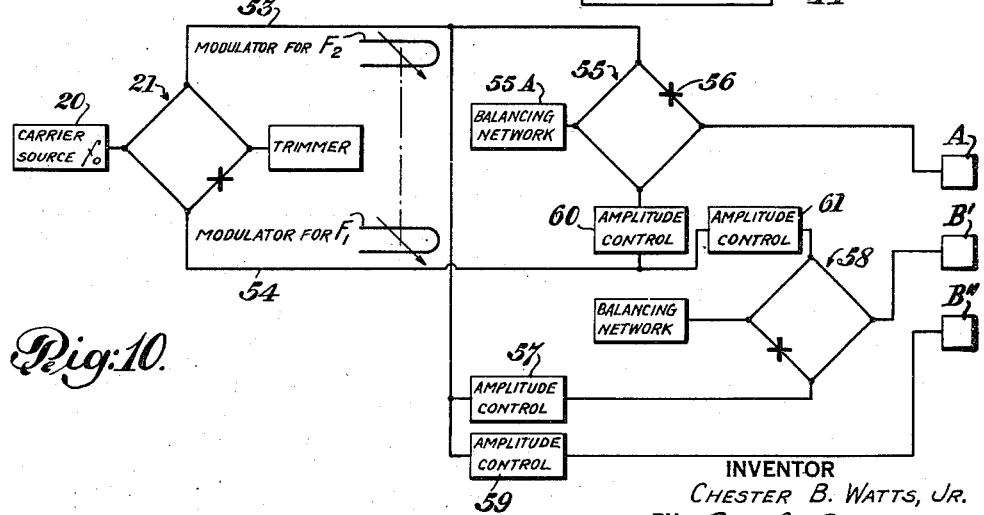

INVENTOR
CHESTER B. WATTS, JR.

Sept. 3, 1946.   C. B. WATTS, JR   2,406,876
INSTRUMENT NAVIGATION SYSTEM
Filed May 29, 1942   4 Sheets-Sheet 4

INVENTOR
CHESTER B. WATTS, JR.
BY Paul R. Adams
ATTORNEY

Patented Sept. 3, 1946

2,406,876

UNITED STATES PATENT OFFICE 2,406,876

INSTRUMENT NAVIGATION SYSTEM

Chester B. Watts, Jr., East Orange, N. J., assignor to Federal Telephone and Radio Corporation, a corporation of Delaware Application May 29, 1942, Serial No. 444,988

16 Claims. (Cl. 250—11)

This invention relates to directive antenna structures and more particularly to such systems as are employed for the instrument landing of aircraft. The invention is considered to be equally adaptable to transmitting and receiving purposes and, in this connection may be useful in radio locating systems—especially where discrimination as to elevation angles of low magnitude is of particular importance.

It is an object of the invention to provide an improved and safer instrument landing system.

Another object is to provide such a system wherein small deviations up or down from the true glide path will be characterized by relatively large signal strength.

A more specific object is to provide means for radiating a vertically directional pattern characterized by relatively weak signal strength throughout the region from zero elevation angle to a substantial fraction of the angle at which the first major lobe occurs.

In accordance with a feature of the invention, I provide means for radiating a vertically directional pattern (suitable for use as one of two overlapping patterns of an equi-signal glide path radiation) and including an undesired lobe of lower elevation than the first (i. e. lowest) useful lobe of said pattern but having a maximum magnitude less than four percent of the maximum signal strength of said first useful lobe.

In accordance with another feature of the invention, I provide means for radiating a vertically directional pattern characterized, in the elevation angle region about the desired glide path, by a signal strength which varies with elevation angle $\theta$ roughly in accordance with the following function:

$$K[\cos \theta_0 - \cos(k\theta - \theta_0)]$$

where $K$ and $k$ are constants and $\theta_0$ is less than twenty-five degrees (positive or negative).

Other objects and further various features of novelty and invention will hereinafter be pointed out or will become apparent to those skilled in the art from a reading of the following specification in connection with the drawings included herewith. In said drawings—

Fig. 1 diagrammatically represents an antenna structure suitable for use in accordance with the invention;

Figure 3:
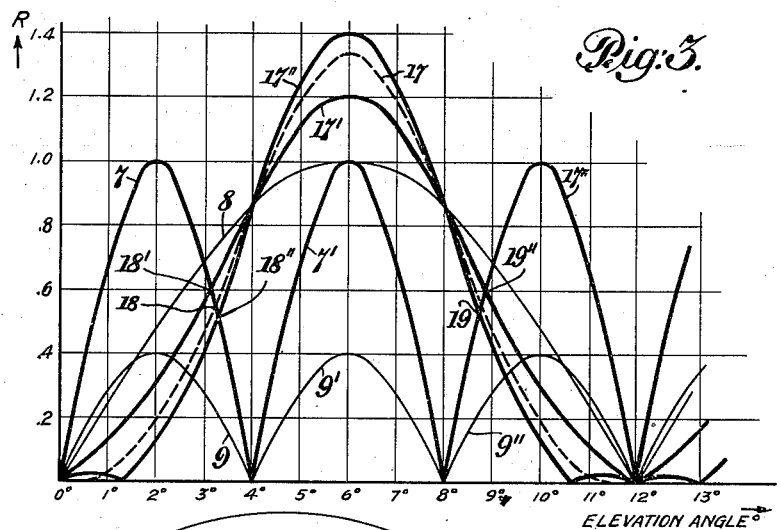
Figs. 2 and 3 are graphical plots of signal strength R as a function of $\theta$ (the elevation angle) for illustrating features of the invention.
Figure 7:
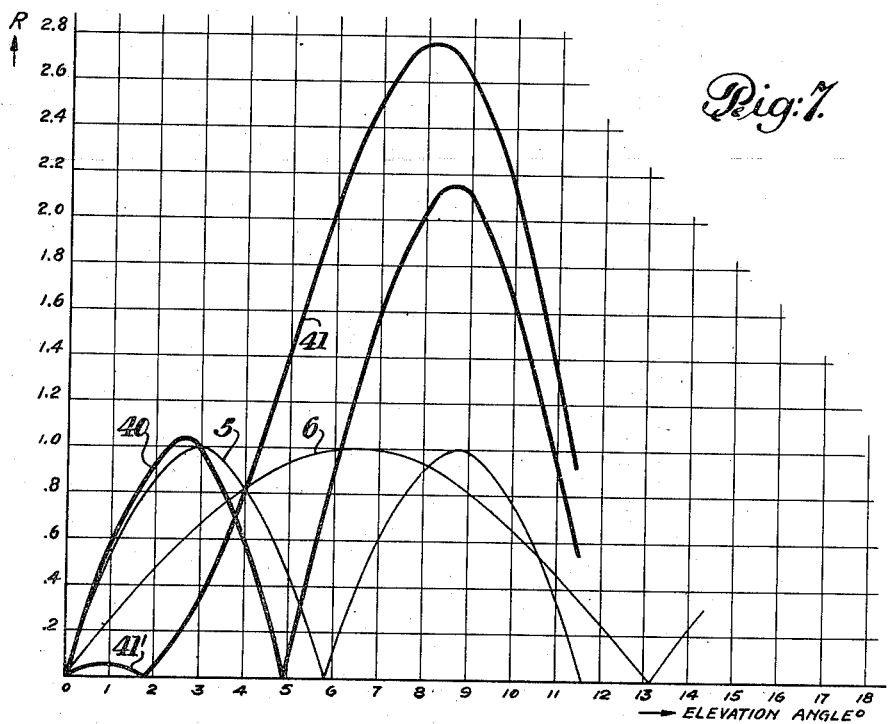
Figure 9:
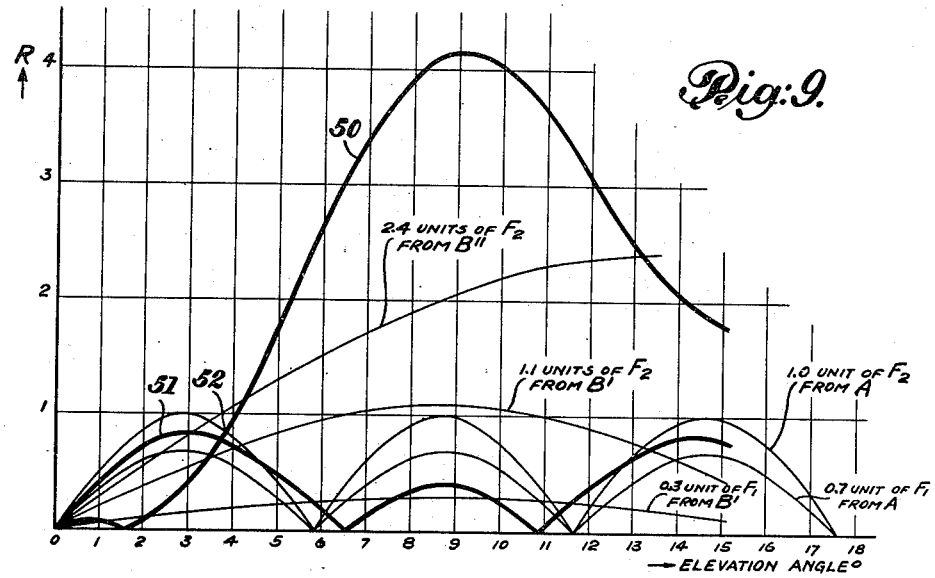
Figure 11:
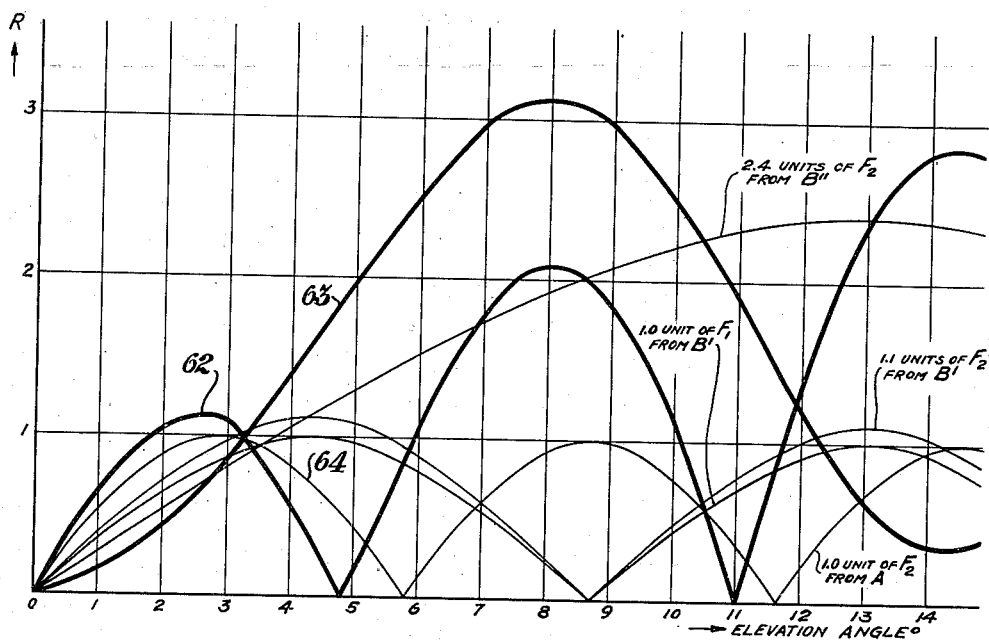
Figure 12:
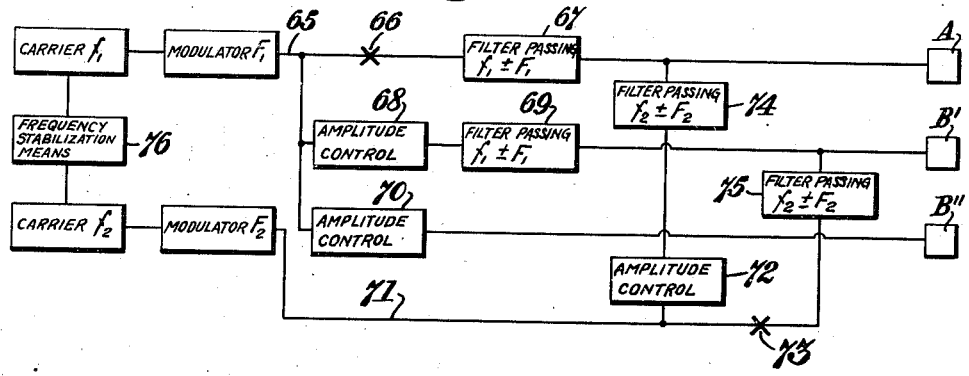

Fig. 5 diagrammatically represents another suitable antenna arrangement;

Fig. 6 is a schematic block diagram of a circuit for feeding the antenna structure of Fig. 5 to yield substantially the radiation characteristics shown in Fig. 3;

Figs. 7, 9 and 11 are graphical plots of signal strength as a function of the elevation angle for further illustrating features of the invention; and Figs. 8, 10 and 12 are schematic block diagrams of appropriate circuits yielding substantially the radiation characteristics shown in Figs. 7, 9 and 11 respectively.

Figure 1:
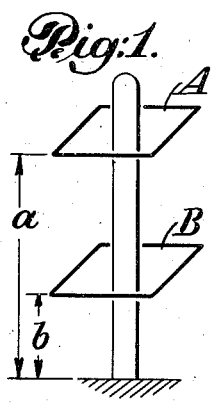

Antenna structures of the so-called vertical type are known for use in connection with setting up radiation fields suitable for instrument landing purposes. Referring to Fig. 1, it has heretofore been proposed that the antenna for defining a glide path by the equi-signal principle should comprise two antennae A, B disposed one above the other.

According to the system heretofore proposed, the higher antenna A is fed with a signal representing a "too low" airplane position (preferably a carrier modulated with 90 c. p. s.) while the lower antenna B is fed with a "too high" signal (preferably a carrier modulated with 150 c. p. s.). The two patterns thus produced overlap and effectively intersect along several conical surfaces, where the axes of said conical surfaces are considered as passing vertically and symmetrically through antennae A and B.

Figure 2:
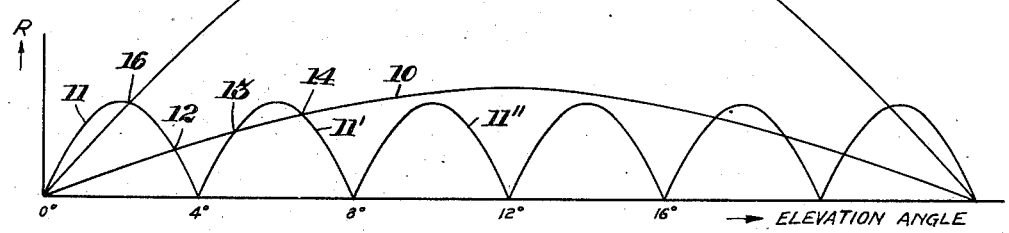

In order better to compare these two different patterns, radiation signal strength R has been plotted as a function of the elevation angle $\theta$ in Fig. 2. In the case illustrated by this figure, it was assumed that the ratio $a:b$ of the respective elevations (with respect to ground) of antennae A and B was such that each lobe 10 of radiation due to antenna B comprises a total elevation angle equivalent to that comprehended by lobes 11, 11′, 11″, etc. of radiation due to antenna A. With this type of system, if maximum radiation due to each of antennae A and B is substantially equal (as illustrated by the lobes 10 and 11), the first intersection 12 of radiation due to antenna A with that due to antenna B, occurs at an angle well above that at which the first maximum of radiation due to antenna A occurs. This circumstance is significant in that, for a given antenna height, the glide path angle is too large; or, conversely, for a desired glide angle, the antenna height must be unnecessarily large. In addition to this fact, there are further intersections 13, 14 for angles very close to that represented by intersection 12. Since each intersection represents an angle which landing instruments aboard an aircraft may indicate as an appropriate glide angle, intersections 13 and 14 may be sources of considerable confusion to a pilot.

It is accordingly necessary in this type of system to increase the magnitude of current fed antenna B with respect to that fed antenna A a substantial amount so as to produce a "swamping" lobe 15 of radiation. It will be noted that the 90-cycle radiation pattern due to antenna A intersects lobe 15 of the 150-cycle pattern at only one point in the first 20 degrees namely, at point 16, near the maximum of the first lobe 11.

However, although any difficulty of confusing intersection 16 with further adjacent intersections of the radiations due to both antennae A and B has been removed, certain other difficulties are presented by this type of radiation. For example, it will be noted that the differences between radiation 15 due to antenna B and radiation 11 due to antenna A for angles of elevation lower than the glide path are relatively small as compared with corresponding differences at elevation angles just above the correct glide path. This condition is considered undesirable in view of the fact that a pilot will not be sufficiently warned of deviations below the latter. A safer glide path should be characterized by relatively great differences in amplitude of the two types of radiation for deviations below the glide plane, so that there will be no danger of running into high ground obstacles as a result of miscalculating the true glide path. Furthermore, a safe glide path should exhibit the feature illustrated by lobes 11 and 15 of presenting no false glide paths for angles which may reasonably be confused with the true glide angle.

In accordance with the invention, these desirable features may be realized by producing the "too high" radiation pattern as a vector sum of two or more elementary radiation patterns from two or more antennae of different heights above the ground. In accordance with a specific feature of the invention two elementary radiation patterns to be combined have their strengths proportioned to make their slopes about equal at or near the zero point and are oppositely phased. Thus the resultant "too high" pattern produced by combining them has a substantially zero slope at or near zero and is therefore delayed in rising to its first large maximum value. Such a pattern may for convenience be referred to as a slow-rise pattern.

A glide path system having a "too high" pattern of the slow-rise type may be constructed with a two-antenna-element structure of the nature shown in Fig. 1 by applying to antenna A not only the usual 90-cycle signal but in addition some 150-cycle signal (exactly like that supplied to antenna B but in phase opposition thereto). In other words, considering the radiation pattern of the 150-cycle signal, the radiation thereof will be modified considerably due to an effective cancellation of radiations from antennae A and B for very small elevation angles in the vicinity of zero elevation. In accordance with the invention the magnitudes of the 150-cycle signal components fed to antennae A and B are such that, when plotted, the two curves are substantially tangent at the lowest elevation angles, say between zero and 1 degree. Upon combining these two components for effective subtraction, therefore, the overall 150-cycle radiation pattern will be seen to have substantially zero radiation for these small angles as well as substantially zero slope (i. e. rate of increase of radiation per degree elevation). Thereafter, between 2 and 3 degrees this radiation will markedly increase (due to the rapid divergence of the two curves after the one due to antenna A passes its maximum and starts to decrease).

Thus the resultant radiation of the 150-cycle or "too high" signal will present substantially the characteristics of curve 17 in Fig. 3, while the 90-cycle or "too-low" radiation, being due to antenna A alone, will have the simple substantially half-sine slope of curve 7, 7', 7'' in the same figure.

The curves of Fig. 3 represent radiations from an array like Fig. 1 where the elevation ratio $a:b$ is 3 so that at low angles there are three lobes of radiation due to antenna A for each lobe due to antenna B. Curves 7—7'—7'', 8, 9—9'—9'', and 17 relate to a system wherein the "too high" signal current in B, the "too high" signal current in A, and the "too low" signal current in A are proportional to the values 1, ⅓, and 1 respectively. Curve 8 represents the "too high" signal component from antenna B. Curve 9—9'—9'' represents the "too high" component from antenna A. Curve 17 represents the resultant "too-high" pattern of slow-rise form. Curve 7—7'—7'' represents the simple pattern of the "too-low" signal as radiated from antenna A only. Point 18 is the intersection of curves 17 and 7. Curves 17' and 17'' are slow-rise curves produced from the same array but with the current proportions adjusted to 1:⅕:1 and 1:⅖:1 respectively instead of 1:⅓:1 as in curve 17.

It will be noted that intersection 18 is formed from one rapidly falling curve 7 and one rapidly rising curve 17 and that therefore, deviations above or below the correct glide plane will be characterized by abnormally large signal reception. It is further to be noted in connection with the arrangement illustrated in Fig. 3, that the next intersection 19 of the two signals characterized by these two types of radiation occurs at an elevation angle well above the true glide plane. There will accordingly be little or no danger in this case of a reasonable pilot mistaking the true glide plane.

Figure 4:
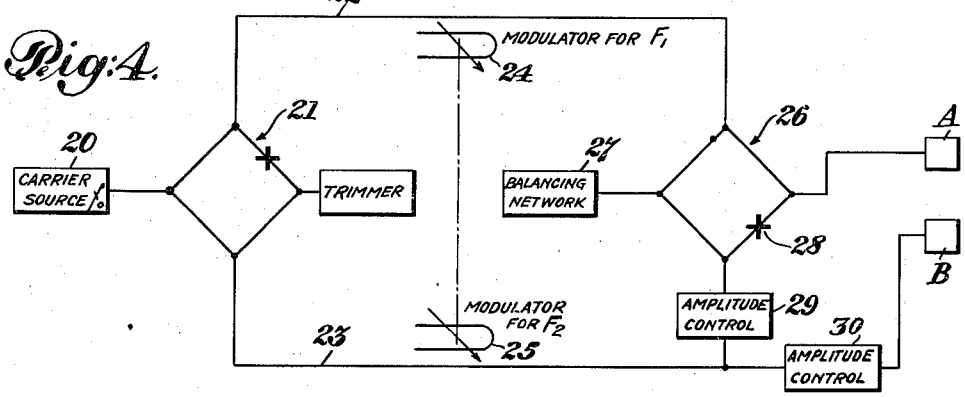
Fig. 4 is a schematic block diagram of a circuit for producing the radiation patterns of Fig. 3 with the antenna apparatus of Fig. 1.

A relatively simple circuit for simultaneously obtaining the two types of radiation in Fig. 3 is shown in Fig. 4. This circuit is designed for producing an equisignal glide path wherein deviation below the true glide plane is detected by a predominance of one steady signal and deviation above is characterized by a predominance of another steady signal. In the form shown, a carrier frequency $f_0$ is supplied from a common source 20 and fed to one terminal of a conjugate network 21 of the type disclosed in the U. S. Patent 2,147,807 to A. Alford. In accordance with the teachings of the said patent, network 21 serves to supply equal amounts of carrier energy into two transmission lines 22, 23 for separate modulation by the respective signals $F_1$ and $F_2$ (which may be 90 and 150 c. p. s. respectively). Also in accordance with the said patent, this modulation is preferably effected by continuously varying the tuned states of a pair of coupled sections 24, 25 associated respectively with lines 22 and 23. The "too-low" signal (consisting of carrier modulated by the 90-cycle signal $F_1$) is then fed from line 22 to one terminal of another conjugate network 26, and the diagonally opposite terminal thereof is similarly connected to line 23 to receive the "too-high" signal (consisting of 150-cycle or F₂-characterized carrier). Other terminals of network 26 are connected respectively to antenna A and balancing network 27. Between the terminals of network 26 connected to antenna A and to line 23, there is a phase reversal element 28 (e. g. a transmission-line transposition) for assuring that none of the "too high" or $F_2$-characterized signals will be fed into line 22 and, conversely, that none of the "too low" or $F_1$-characterized signals will be fed into line 23. Amplitude control means 29 is provided in the line supplying the signal $F_2$ to network 26, whereby the amount of signal $F_2$ to be radiated from antenna A may be controlled with respect to the amount of signal $F_1$ radiated therefrom. As explained above, antenna B is fed with only one signal and, in the form shown, it is connected to line 23 so as to radiate carrier characterized with $F_2$ modulation. For purposes of controlling the magnitude of radiation from antenna B with respect to that from antenna A, suitable amplitude control means 30 are provided in its supply line.

In the embodiment above described as a first illustration, it was assumed for simplicity, that patterns 8 and 7—7'—7'' each had an intensity of one unit while the elementary radiation pattern 9—9'—9'' (representing the "too high" signal energy from the antenna A) had such an intensity as to be substantially tangent to pattern 8 (representing the "too high" signal energy from the antenna B). This latter assumption required that pattern 9—9'—9'' be about ⅓ the amplitude of pattern 8 since the spread between two successive nulls of pattern 9—9'—9'' was about ⅓ the corresponding spread for pattern 8. These simple assumptions led to the postulation of current strengths proportionate to 1:⅓:1 as above set forth.

The two intersecting patterns 17 and 7—7'—7'' which result from these simple assumptions prove to be reasonably useful from the most essential standpoints. Considering first the important criterion of how low a glide angle can be defined with a given antenna height, it will be seen from Fig. 3 that a glide angle can be established at 3.25°. Now the curves of this figure are based upon antenna heights a and b of about 7.2 wave lengths and 2.4 wave lengths respectively. Thus if the percentage of lowness of the glide path be taken as 300 times the reciprocal of the glide path elevation in degrees (so that a glide path of 3° has 100% lowness while a glide path of 6° has only 50% lowness) the simple embodiment above described gives 92.4% lowness for an overall height of 7.2 wave lengths or 12.8% lowness per wave length of height.

Considering next the sharpness of the glide path, this may usefully be defined by the number of degrees divergence downward from the true glide path required to yield a two-to-one intensity ratio between the 150 and 90 cycle signals. Using this criterion, it will be seen from Fig. 3 that at 2.75° the 90-cycle-modulated signal has an intensity of about 0.78 while the 150-cycle-modulated signal has an intensity of about 0.39. Thus since the glide path 18 is at 3.25°, the sharpness is approximately 0.5 degree.

Finally, consideration may be given to the power wastage which will be roughly indicated by the ratio of the maximum power radiated in any one direction off the glide path to the power radiated along the glide path. In the case of the simple first embodiment above taken for illustration, the power radiated at 6° is $$(1.33)^2 + (1)^2 = 2.78$$

and the power radiated along the glide path is $(.55)^2 + (.55)^2 = .6$ Thus the wastage ratio is 4.6.

By slightly varying the ratio of the "too high" signal currents fed to antennae A and B the elementary patterns corresponding to patterns 8 and 9—9'—9'' will become less accurately tangent and the combined pattern will change from the form shown in curve 17 to the form shown in curve 17' or 17''.

If for example the 150-cycle-modulated currents are fed to antennae B and A in the ratio 1:⅕ (instead of 1:⅓ as before) the elementary pattern due to antenna A will be of smaller amplitude than curve 9—9'—9'' and therefore the combined pattern 17' instead of having a zero slope at the origin will start rising immediately. If such a pattern 17' is substituted for pattern 17 (the pattern 7—7'—7'' being retained without change for the "too low" signal) the resulting system will be a little better than the first embodiment in respect of lowness and power wastage ratio but a little less desirable in sharpness. More specifically for this second embodiment represented by curves 17' and 7—7'—7'' the lowness is 13.2% per wave length of height, the wastage ratio is 3.4 and the sharpness angle for two to one signal ratio is about 0.65 degree.

If on the other hand the A antenna's share of the 150-cycle-modulated signal is raised instead of lowered, so that the current ratio is 1:⅔ for this signal, the resulting embodiment will be slightly less advantageous in respect to lowness of glide path for a given antenna height as well as in respect to the power wastage, but the sharpness will be improved. More specifically for such third embodiment (having a 1:⅔:1 proportion for the "too high" current in antenna A the "too high" current in antenna B and the "too low" current in antenna B respectively) the patterns will correspond to curve 17'' and curve 7—7'—7''. It can be computed that these patterns give about 12.6 percent lowness per wave length of height, a power wastage ratio of 5.5, and a sharpness of about .47 degree.

In accordance with the invention, the lowness per wave length of height can be increased by providing for the "too low" signal, in lieu of the conventional half-sine pattern 7—7'—7'' a modified pattern which will cause the intersection defining the glide plane to occur at smaller angles for given antenna heights. This modified half-sine is illustrated in Fig. 7 as the curve 40. Curve 40 is the resultant of a vectorial addition of some radiation from both antennae A and B in a phase relationship similar to that required to produce the slow rise type of curve (such as curves 17, 17', 17'' in Fig. 3 and curve 41 in Fig. 7) but with the relative magnitude greatly altered. To produce the slow-rise type of pattern previously described the amplitudes of the two elementary 150-cycle radiations are so adjusted that in the low angle region below 1½° or 2° they are roughly equal and in the region near the glide angle the slower varying radiation from the lower antenna B is predominant so that around the glide angle the resultant 150-cycle radiation may be said to consist of the 150-cycle radiation from B minus the 150-cycle radiation from A. To produce the modified half-sine curve 40 for the 90-cycle signal on the other hand the elementary 90-cycle pattern from antenna A should predominate over that from B so that around the glide angle the resultant 90-cycle radiation may be said to consist of the 90-cycle radiation from A minus the 90-cycle radiation from B. For convenience the former procedure of combining radiations to yield a slow-rise pattern consisting of B radiation minus A radiation may be hereinafter referred to as a normal subtraction process, and the latter procedure of combining radiations to yield a modified half-sine pattern consisting of A radiation minus B radiation may be referred to as a reversed subtraction process.

The curves illustrated in Fig. 7 relate to a two-element antenna array as illustrated in Fig. 1, wherein antenna A is disposed at an elevation of 5 wave lengths while antenna B is 2.2 wave lengths above the ground. At 330 megacycles, these heights are 4.5 meters and 2 meters. The elementary radiation pattern from antenna A alone is therefore a half-sine curve consisting of a series of lobes such as 5 occurring alternately in phase opposition at periods of about 5.8°. The elementary radiation pattern from antenna B alone is characterized by somewhat fatter lobes 6 having a periodicity of about 13.1°. Curve 41'—41 is a slow-rise pattern similar to curve 17" of Fig. 3. In the system represented in Fig. 7, curve 41 is characterized by the $F_2$ signal and is obtained by radiating the same at unit magnitude from antenna B and substantially half unit magnitude in opposed phase relationship from antenna A, while the $F_1$ signal is fed to antenna A in three-quarters unit magnitude and to antenna B in phase opposition to that fed antenna A and at substantially half the magnitude of the latter, that is, about three-eighths unit magnitude.

The result of both these normal and reversed subtraction processes with respect to signals $F_1$ and $F_2$ will be observed as yielding a pair of curves 40 and 41 which are well separated from each other for substantial arcs both sides of the glide angle. It will further be observed that the intersection point of curves 40 and 41 more nearly approaches the maximum of curve 5 whereby a more desirable glide angle of approximately 3.7° is obtained with the above-indicated antenna dimensions at the specified carrier frequency. This represents a lowness of 16.2% per wave length of height. The sharpness is about .5 degree, i. e. practically the same as before. It is to be noted, however, that this improvement as to lower glide angle for given antennae heights has been gained at the expense of radiating efficiency, for, with the arrangement according to Fig. 7, the ratio of power on course to maximum power in any one direction off course is a little less than 1:12.

An appropriate circuit for obtaining the radiation patterns illustrated in Fig. 7 is shown in Fig. 8, wherein the common carrier frequency source 20 and modulator means 24 and 25 for modulating carrier with the signals $F_1$ and $F_2$, respectively, will be recognized. In order to produce curve 41, line 23 is directly connected to antenna B through one arm of a conjugate network 44, and to antenna A by way of appropriate amplitude control means 45 and another conjugate network 46. Since it was necessary in the production of curve 41 that the $F_2$ signal be supplied to antennae A and B in reversed phase relation, the phase reversal element 47 of network 46 is included in the arm thereof adjacent antenna A and line 23. In the assumed case, the magnitude of $F_2$-modulated signal fed to antenna A is one half unit (where a unit represents the magnitude of the $F_2$ signal fed to antenna B). Amplitude control means 45 is therefore adjusted to effect a 50% current magnitude reduction.

The $F_1$ signal is used to produce curve 40 by directly connecting line 22 to terminal 46' of network 46 and also through appropriate amplitude control means 48 to terminal 44' of network 44. As above indicated, curve 40 was obtained by a reversed subtraction involving antiphasal radiation of the $F_1$ signal from both the antennae. The phase reversal element in both networks 46 and 44 are therefore so disposed that the $F_1$ signal is conveyed to both antenna elements in such manner that one is in phase opposition with respect to the other. Since the magnitude of the $F_1$ signal supplied to antenna B is to be one half that of the same signal supplied to antenna A, amplitude control means 48 is so adjusted as to effect a 50% reduction in $F_1$-modulated carrier current magnitude. With respect to the $F_2$ signal current fed antenna B, which current has been considered as of unit magnitude, the $F_1$ signal fed antenna A is three-quarters this value, and that fed to antenna B is three-eighths thereof. Accordingly, amplitude control means 49 is included in line 22 prior to its branch connections to networks 44 and 46. When control means 49 is adjusted in accordance with this three-quarters factor, it is clear that both antennae will be supplied with signals $F_1$ and $F_2$ in correct proportion and phase simultaneously to produce the $F_1$ signal in accordance with radiation curve 40 and the $F_2$ signal in accordance with curve 41.

It will be observed that inherent in the operation of the circuits of Figs. 4 and 8 above described, is the undesirable feature, due to the arrangement of network 26 or 46, that for each watt of power supplied to antenna A for radiation, approximately one watt is dumped or lost in the balancing network (e. g. network 27 of Fig. 4 or network 55A of Fig. 8). Such inefficiency may be avoided while still yielding substantially the same type of radiation characteristics as above described in connection with Figs. 3 and 4. To accomplish this, the antenna structure of Fig. 1 should be replaced by an antenna structure of the nature shown in Fig. 5 connected as shown in Fig. 6. This alternate antenna structure comprises an additional radiating element so that there are in all three antennae A, B', and B'' disposed one above the other. Antennae A and B' may be relatively close to each other but not so close as to exhibit undesirable interaction. If the elements A and B have directivity in themselves, they may be tilted or displaced horizontally (perpendicular to the flight path) so that each may have its null aimed at the other to decrease interaction even with the antennae quite close to each other—or at least at nearly the same height. In order to obtain substantially the effects shown in Fig. 3, the elevations of antennae A and B' may be almost alike and the mean height of antennae A and B' is made equal to the height computed for antenna A in Fig. 1. Thus the arrangement is approximately equivalent to that shown in Fig. 1, as will be clear.

A circuit for feeding the array of Fig. 5 to produce effects similar to those produced by the circuit of Fig. 4 is shown in Fig. 6 wherein the common carrier source 20 and modulators 24 and 25 will be recognized. Since antennae A and B' are sufficiently spaced so as to have relatively little interaction, there is no need for a further conjugate network. The $F_1$-characterized signal may therefore be fed directly to antenna A and the F₂-characterized signal directly to antennae B' and B'' in appropriate amplitude relation as controlled by amplitude controls 31, 32. Again in order to obtain the desired effective subtraction in connection with radiation of the F₂-characterized signal, the line feeding antenna B' includes a phase reversal element 33.

Instead of considering the array of Fig. 5 as being merely an approximate equivalent of Fig. 1 (an approximation which is valid only if antennae A and B' have nearly the same heights), the array may be more rigorously analyzed as comprising one pair of antennae B', B'' used for radiating the "too high" signal in accordance with a slow-rise type of pattern and one further lone antenna used for radiating the "too low" signal in accordance with a conventional half-sine pattern. When computing the radiation patterns on this basis, the actual heights of B' and B'' may be used in plotting the slow-rise radiation pattern of the F₂ or "too high" signal, and the actual height of antenna A may be used in plotting the conventional pattern of the F₁ or "too low" signal.

In a preferred embodiment of the invention the form of array shown in Fig. 5 is proportioned with antennae B'' and B' at heights of 2.17 and 6.5 meters respectively and the 150-cycle-modulated 330 megacycle "too high" signals are fed into these antennae with current strengths of 1 unit, and ⅖ units respectively, thus producing for this signal a slow-rise pattern exactly like curve 17'' of Fig. 3. The A antenna used for radiating the 90-cycle-modulated 330 megacycle "too low" signal in this system is 7.5 meters high thus giving a conventional pattern of substantially half-sine form, similar to the pattern 7, 7', 7'', but narrowed so that its first null is at 3½° instead of 4°. If this signal is fed into antenna A with a current strength of 1 unit the "too low" pattern will be practically the same as curve 7—7'—7'' except for the narrowing above mentioned. Thus, no special set of curves is shown to illustrate this embodiment since curves 17'' and 7—7'—7'' of Fig. 3 may (by disregarding the calibrations in degrees) be regarded as rough illustrations of the general form of the radiation patterns of this embodiment. The intersection of the two patterns of this embodiment occurs very nearly at 3°, thus giving a somewhat lower glide path than the patterns of Fig. 3. The antenna height assumed, however, is substantially higher (e. g. 8.2 wavelengths) than in the case of Fig. 3. The percentage of lowness per wave length of antenna height is therefore only about 12.2% being thus slightly less than for Fig. 3.

It will be observed that in all of the above-described radiation configurations, false courses are bound to occur at elevation angles within about three times the glide angle defined thereby. As indicated above, this condition is not ordinarily serious, for a reasonable pilot will normally be able to distinguish between a proper glide angle of about 3° and a false one three times as steep. However, in order unmistakably to define a glide angle without there being any secondary or false angles at anywhere near the proper magnitude, I propose to employ three vertically disposed radiating elements to produce patterns substantially as shown in Fig. 9. To this end, an antenna structure of the nature shown in Fig. 5 may be employed. In a specific case wherein antenna A is disposed 4.5 meters above the ground, antenna B' is at 1.5 meters elevation, and antenna B'' is at one meter, the curves shown in Fig. 9 result for an operating frequency of 330 megacycles.

In this figure, curve 50, representing radiation of the F₂ signal, is a composite of radiation from all three of the antenna elements, and curve 51, representing radiation of the F₁ signal, is formed by using the upper two antennae A and B'. In order to ensure that oscillations of curve 50 subsequent to the initial rise thereof occur so safely above those of curve 51 as not to permit an intersection of these two curves except at point 52 (for the glide angle), curve 50 has a component of radiation from the lowest antenna element B'' of a magnitude approximately 2.4 times unit magnitude. Due to the fact that radiator B'' is but a meter from the ground, lobes of radiation therefrom are relatively fat and have a periodicity of the order of 30°. Thus curve 50 is prevented from intersecting curve 51 for substantially that range of elevation angles. In order to promote a steepness in the first rise of curve 50, the F₂ signal is supplied to antenna B' in substantially 1.1 current magnitude and to antenna A in unit magnitude and opposed phase relation with respect to its supply to the lower two antenna units B' and B''.

In order to ensure that the first lobe of curve 51 representing radiation of the F₁ signal, will be of substantial magnitude and at the same time in order to prevent subsequent lobes thereof from attaining such magnitudes as may be likely again to intersect with curve 50, the former is composed of two components radiated from the upper two antenna elements A and B' in aiding phase for their lowest elevation lobes. In the form shown, curve 51 is the resultant of F₁ signal current of 0.7 unit magnitude supplied to antenna A and 0.3 unit magnitude supplied to antenna B'. The resultant of such radiation of the F₁ and F₂ signals is thus seen to define a reasonably low glide angle (3.7°) for a given maximum antenna height (4.5 meters at 330 megacycles, i.e. 5 wave lengths). It is quite clear from an inspection of the trend of curves 50 and 51 for larger elevation angles that these two curves will not intersect one another to form a confusing or secondary glide path until some abnormally large angle, of the order of 25 to 30 degrees, is reached.

An appropriate circuit for supplying the three antenna elements A, B' and B'' simultaneously to generate radiation patterns 50 and 51, is shown in Fig. 10 wherein the circuit for producing the F₁ and F₂ modulated carriers will be recognized from the several foregoing circuit diagrams. In the form shown, the F₂-characterized carrier is supplied in a line 53, and the F₁-characterized carrier in a line 54. Line 53 is connected to one terminal of a conjugate network 55, and the latter serves to relay the F₂ signal in unit current magnitude to antenna A, as will be clear. As indicated, the supply of the F₂ signal to antenna A is in reversed phase relation; accordingly, the phase reversal element 56 of network 55 is in the arm thereof joining antenna A and line 53. The F₂ signals are also simultaneously supplied to antenna B' through appropriate amplitude control means 57 and another conjugate network 58, and to antenna B'' through amplitude control means 59. As indicated, the supply of F₂ signals to antenna B' is at 1.1 unit magnitude; accordingly, amplitude control means 57 is adjusted to effect this amplification. In the same way, amplitude control means 59 is set to effect a 2.4 increase in magnitude of the $F_2$ signals supplied to antenna B''.

The $F_1$ signals are supplied to antennae A and B' simultaneously by branches of line 54 connected respectively to terminals of networks 55 and 58, which terminals are opposite those at which the $F_2$ signals are furnished. In order to effect the appropriate proportioning of these signals with respect to the above-mentioned unit current magnitude, amplitude control means 60 and 61 are included in the respective branches of line 54 connected to conjugate networks 55 and 58. In order to produce the curve 51 of Fig. 9, control network 60 is adjusted to effect a reduction in $F_1$-signal current to 0.7 unit magnitude, and control network 61 is adjusted to effect a reduction thereof to 0.3 unit magnitude.

In connection with the radiation patterns of Fig. 9, it will be noted that the comparatively great degree of freedom from false glide angles has been obtained with a substantial sacrifice in radiating efficiency, for, in that case, the ratio of power on course to maximum power off course is of the order of 1:14. Actually, however, much closer false courses may be tolerated and in accordance with a further embodiment, this efficiency expression is vastly improved and at the same time, the glide angle is still further reduced for the same maximum antenna height.

This latter embodiment produces the radiation characteristics of Fig. 11 by means of a circuit such as shown in Fig. 12. The antenna structure for producing these patterns is substantially the same as that required to produce the patterns of Fig. 9 with the exception that the middle antenna element B' is at twice its former height, that is, three meters for the assumed case of 330 megacycle operation. Radiation of the $F_1$-characterized carrier is of the form shown by curve 62, and the $F_2$-signal radiation is represented by curve 63. The latter is, as in the case of Fig. 9, formed as the resultant of radiation from all three antenna elements in the same magnitude and phase relation proportions as above-considered for Fig. 9. Curve 62, however, is formed by a so-called reversed subtraction process of the nature above described in connection with curve 40 in Fig. 7. In the form shown, the $F_1$ signal is supplied to antenna A in twice the unit current magnitude and to antenna B' in unit magnitude and opposed phase relation with respect to the $F_1$ signal fed antenna A.

The result of this reversed subtraction (curve 62) will be seen to produce a first lobe of $F_1$ radiation having a shorter periodicity than that of radiation due to the highest antenna element (see lobe 64). Thus, if radiation of this lobe 62 were controlled to be approximately the same maximum magnitude as that of lobe 64, it follows that the intersection defining the glide angle will be lower than the corresponding intersection which would result from use of the simple lobe 64. Also it is evident that the reversed subtraction gives a greater sharpness than would be obtained by use of the simple lobe 64.

It is to be noted that the second lobe of curve 62 is of greater magnitude than the first. This factor, while detrimental from the standpoint of power wastage ratio, clearly in no way affects the sharpness or unmistakability of the proper glide course. The first false course as set up by the second intersection of curves 62 and 63 occurs at virtually 12°, that is, almost four times the proper glide angle. It is considered that even under the most adverse headwind conditions, it will be impossible for a reasonable pilot to mistake this second course at 12° for the proper glide plane.

In order to illustrate an alternate method of supplying the radiating elements with appropriate mixtures of the two signals $F_1$ and $F_2$ for radiation in accordance with the invention, the form of circuit arrangement shown in Fig. 12 is used to illustrate how this alternate method may be adapted to produce the radiation patterns of Fig. 11. In accordance with this form, signal $F_1$ modulates a first carrier $f_1$, and the signal $F_2$ modulates a second carrier $f_2$. Appropriate mixing means are provided for radiating the two signals $F_1$ and $F_2$ in accordance with the invention, and when an aircraft is equipped with receiver means having sufficient band width of response to comprehend both carriers $f_1$ and $f_2$, it is clear that the original characteristic signals $F_1$ and $F_2$ may be detected and then separately discriminated as by filter means to derive glide-path-indicating signals.

In the form shown, the carrier $f_1$ modulated by signal $F_1$ is supplied in a line 65 having three branches leading respectively to antennae A, B', and B''. The first of these branches includes a phase reversal element 66 and filter means 67 passing only the signal supplied in line 65, that is, the carrier $f_1$ together with the $F_1$ side-bands. The second branch includes amplitude control means 68 and another filter 69 passing the same frequencies as filter 67. The third branch includes merely amplitude control means 70. As explained above, the $f_1$ carrier and its $F_1$ side-bands are supplied to antenna A in unit current magnitude, to antenna B' in 1.1 times unit magnitude, and to antenna B'' in 2.4 times unit magnitude. Amplitude control means 68 and 70 are appropriately adjusted with respect to each other and to the magnitude of current supplied to antenna A to secure this proportioning of current magnitudes, as will be clear.

The $f_2$ carrier as modulated by the signal $F_2$ is supplied in a line 71 having two branches connected respectively to the upper antenna elements A and B'. The first of these branches includes amplitude control means 72 and a filter network 74 passing only the frequencies present in line 71. The other branch includes a phase reversal element 73 and another filter 75 similar to filter 74. Carriers $f_1$ and $f_2$ are preferably relatively close to each other in the frequency spectrum, and their proximity is governed by the ability of filters 67 and 69 to discriminate against the frequencies present in line 71 and by the converse ability of filters 74 and 75 to discriminate against the frequencies present in line 65. Amplitude control means 72 is adjusted to effect an amplification of substantially twice the unit current magnitude. When this adjustment is made, it is clear that the circuit of Fig. 12 will be effective to radiate simultaneously in accordance with curves 62 and 63 substantially as shown in Fig. 11.

It is to be noted in connection with the embodiment shown in Fig. 12 that it has been possible to avoid the above-noted inefficiency (due to a power dumping) arising out of the use of a number of conjugate networks and that relative little additional apparatus is necessary. If desired, the carriers $f_1$ and $f_2$ may be maintained in substantial alignment with respect to each other by means of appropriate frequency stabilization means 76 associated with both the respective sources of carriers $f_1$ and $f_2$ whereby the total band-width required for the system may be made a minimum.

It will be clear that the form of feeding arrangement shown in Fig. 12 may be used in place of the forms shown in Figs. 4, 8 and 10 to give patterns such as illustrated in Figs. 3, 7 and 9. Similarly, the principle (described in connection with Figs. 5 and 6) of using two separate antennae close together instead of one antenna fed with two signals, may be applied to all the embodiments illustrated as having two signals applied to one element of an array.

It will be noted that some of the above described embodiments have fairly low radiating efficiency as measured by the power wastage ratio; but in many cases this decrease in efficiency may be justified by the very substantial improvement in the sharpness and in the maximum 90 to 150 cycle signal ratio observable below the glide plane. In the case of the radiation pattern shown in Fig. 11, for example, the efficiency power ratio dropped only to 1:7.6. It is particularly to be emphasized that at the very reasonable operating wave length of 330 megacycles the results shown, for example, in Fig. 11 were obtained with a maximum antenna height of 4.5 meters, that is, about 14.5 feet.

From an examination of all of the figures graphically showing radiation patterns in accordance with the invention, it will be observed that the slow-rise type of curve formed by what has been termed a normal subtraction process (e. g. curve 41 in Fig. 7) is generally S-shaped for angles up to and in the neighborhood of the glide path; the lower end of the S commencing sometimes with a zero slope (e. g. curve 17), sometimes with a small downward slope (e. g. curve 17″) and sometimes with a small upward slope (e. g. curve 17′). Roughly the S-shaped form of the curve resembles the first half cycle of a cosine curve; and to a fair approximation the shapes of the various possible forms of so-called "slow-rise" curves shown and described hereinabove may be conveniently defined by the cosine function $$K[\cos \theta_0 - \cos (k\theta + \theta_0)]$$

where $K$, $k$ and $\theta_0$ are constants. If this expression is used to describe the shapes of the slow-rise pattern, the preferred shapes can be said to be those corresponding to a value of $\theta_0$ between $+20°$ and $-20°$. If on the other hand the slow-rise patterns are to be considered as made up of a slowly periodic elementary curve from which there is subtracted a smaller more rapidly periodic elementary curve, then the preferred forms of such slow-rise patterns may be said to be those whose initial slope is roughly between $+\frac{1}{3}$ the slope of the slowly periodic elementary curve and $-\frac{1}{2}$ this slope. Generally speaking, satisfactory results may be obtained when the ratio of $F_2$-signal amplitudes in the lower antenna element B with respect to amplitudes of the $F_2$ signal in the upper antenna element A is C times the inverse ratio of respective elevations of these elements above ground, where C is between 0.7 and 1.9. In other words the $F_2$ signal current ratio (i. e. of the lower element to the upper) is C times the ratio of the height of the upper element to that of the lower element. Preferred conditions, however, call for slightly stricter limits of C as between 0.8 and 1.6.

It will further be observed in connection with the above described figures, in which the $F_1$ signal was formed by what is termed as a reversed subtraction process, that the proportioning of the component of this signal radiated from the lower antenna element with respect to the component of this signal radiated from the upper element occurs in a preferred relationship. More specifically for the $F_1$ signals the ratio of the current in the lower element to that in the upper should be $C'$ divided by the corresponding height ratio, where $C'$ is between 0 and 0.75. The preferred somewhat narrower limits for $C'$ are between 0 and 0.60.

Although this invention has been described in connection with transmitting apparatus, it is not to be interpreted as limited to that type of use but rather it is adaptable both to transmitting and receiving purposes. In the latter case, it may find utility in radio locating systems of the type wherein radiations emitted (or reflected) from a plane are received on two receivers (or on one A–N-keyed receiver) making use of the equality of two reception patterns for determining the direction of the plane.

While I have particularly described my invention in connection with systems producing tone modulated signals for an equi-signal course, it is clear that its principles are equally adaptable to other known course-defining systems, such as for example, the well-known aural indicating system wherein the two patterns defining the glide course are alternately radiated in accordance with a keyed pattern. In connection with the above-described circuits keying means may be substituted for the modulators. Furthermore, in keying systems the use of power dumps may be altogether avoided by merely switching over the antennae so that in one key position they receive the relative powers above described for signal $F_2$, and in the other position they receive the relative powers described for signal $F_2$. Under such conditions, the keying means may be said to couple the antennae to the transmitter in one relation (i. e. with one set of amplitudes) "in respect of one signal" while coupling the same antennae thereto in a different relation "in respect of a second signal." Likewise, in the earlier described illustrations of feeding the antennae in accordance with the invention by the use of a common carrier separately modulated in two branch lines in accordance with two signals, it may also be said that the antennae are coupled to the common carrier source in one relation "in respect of a first signal," and in another relation "in respect of a second signal."

Although I have described my invention in detail in particular connection with the preferred forms illustrated, it is to be understood that many modifications, additions and omissions may be made fully within its scope, as defined by the appended claims.

What is claimed is:

1. Glide path apparatus suitable for instrument landing of aircraft, comprising a first antenna means and a second antenna means disposed one generally above the other, a first wave-translating means operating at a predetermined carrier frequency, means coupling said first and said second antenna means to said wave-translating means, a second wave-translating means also operating at said frequency, and means coupling said second wave-translating means solely to said first antenna means.

2. Apparatus according to claim 1 wherein said first antenna means is disposed above said second antenna means.

3. Apparatus according to claim 1 wherein said first antenna means is disposed above said second antenna means and wherein said first antenna means includes two antennae, one of said two antennae being connected to said last-defined coupling means, and the other of said antennae being connected to said first-defined coupling means.

4. Apparatus according to claim 1 wherein said first antenna means is disposed above said second antenna means and further wherein said first antenna means includes two antennae, one of said two antennae being connected to said last-defined coupling means and the other of said antennae being connected to said first-defined coupling means, said two antennae being less spaced with respect to each other than the spacing between either of said two antennae and said second antenna means.

5. Glide path apparatus suitable for instrument landing of aircraft, comprising a first antenna means and a second antenna means disposed one generally above the other, a first wave-translating means operating at a given modulation frequency, means coupling said first and said second antenna means to said wave-translating means, a second wave-translating means operating at a modulation frequency different from said given frequency and means coupling only said first antenna means to said second wave-translating means, said first-mentioned coupling means including means coupling said first wave-translating means to said first antenna means in a first energy transfer relation and means coupling said first wave-translating means to said second antenna means in a second energy transfer relation differing in phase from said first energy transfer relation.

6. Glide path apparatus suitable for instrument landing of aircraft, comprising a first antenna means and a second antenna means disposed one generally above the other, a first wave-translating means, means coupling said first and said second antenna means to said wave-translating means in substantially opposite phase, a second wave-translating means, and means coupling said first antenna means and said second antenna means to said second wave-translating means in substantially opposite phase, said first-mentioned coupling means including means coupling said first wave-translating means to said first antenna means in a first energy transfer relation and means coupling said first wave-translating means to said second antenna means in a second energy transfer relation different in magnitude and phase from said first energy transfer relation, said second-mentioned coupling means including means coupling said second wave-translating means to said first antenna means in a third energy transfer relation and means coupling said second wave-translating means to said second antenna means in a fourth energy transfer relation different in magnitude and phase from both said third energy transfer relation and said second energy transfer relation.

7. Glide path apparatus suitable for instrument landing of aircraft, comprising a first antenna means and a second antenna means disposed one generally above the other, first signaling means for feeding said first and second antenna means in substantially opposite phase with energy characterized by a first signal, second signaling means for feeding said first and second antenna means in substantially opposite phase with energy characterized by a second signal, said first signaling means being adapted to feed to said first antenna means more energy than said second signaling means, but said second signaling means being adapted to feed to said second antenna means more energy than said first signaling means, whereby said first antenna radiates predominantly energy characterized by said first signal and said second antenna radiates predominantly energy characterized by said second signal.

8. Glide path antenna apparatus suitable for instrument landing of aircraft, comprising a first antenna means and a second antenna means disposed one generally above the other and above a ground, a wave-translating means, and means coupling said first and said second antenna means to said wave-translating means, said coupling means including amplitude control means coupling said first antenna means to said wave-translating means in a first energy transfer relation and amplitude control means coupling said second antenna means to said wave-translating means in a second energy transfer relation, and the two amplitude control means being adjusted so that the ratio of magnitude of said first energy transfer relation to that of said second energy transfer relation is of the same order of magnitude as the ratio of the elevation above said ground of said second antenna means to that of said first antenna means.

9. Apparatus according to claim 8 wherein the two amplitude control means are adjusted so that the ratio of the magnitude of said energy transfer relations is between .7 and 1.9 times the ratio of the elevation of said second antenna means to that of said first antenna means.

10. Glide path antenna apparatus suitable for instrument landing of aircraft, comprising a first antenna means and a second antenna means disposed one generally above the other and above a ground, a wave-translating means, and means coupling said first and said second antenna means to said wave-translating means, said coupling means including amplitude control means coupling said first antenna means to said wave-translating means in a first energy transfer relation and amplitude control means coupling said second antenna means to said wave-translating means in a second energy transfer relation, and the two amplitude control means being adjusted so that the magnitude of said first energy transfer relation with respect to said second energy transfer relation is such that for small elevation angles above said ground the magnitude of the characteristic curve of said first antenna means substantially equals that of said second antenna means.

11. Apparatus according to claim 1 wherein said first antenna means comprises two radiating elements spaced one above the other, wherein said first-mentioned coupling means includes means coupling said first wave-translating means to one of said radiating elements in a first energy transfer relation and means coupling said first wave-translating means to the other of said radiating elements in a second energy transfer relation, and further wherein said second-mentioned coupling means includes means coupling said second wave-translating means to one of said radiating elements in a third energy transfer relation and means coupling said second wave-translating means to said other radiating element in a fourth energy transfer relation, said first energy transfer relation being of substantially opposite phase to said second energy transfer relation and said third energy transfer relation being of substantially opposite phase to said fourth energy transfer relation.

12. Glide path antenna apparatus for operation at a given carrier frequency and suitable for instrument landing of aircraft, comprising a first antenna means, a second antenna means, and a third antenna means disposed one generally above the other and spaced with respect to each other at least a half wave-length at said operating frequency; a first wave-translating means; means coupling said wave-translating means to said first antenna means in a first energy transfer relation, to said second antenna in a second energy transfer relation, and to said third antenna means in a third energy transfer relation, all said energy transfer relations being different; a second wave-translating means; and means coupling said second wave-translating means to said first antenna means in a fourth energy transfer relation and to said second antenna means in a fifth energy transfer relation different from said fourth energy transfer relation.

13. Glide path antenna apparatus suitable for instrument landing of aircraft, comprising a first antenna means and a second antenna means disposed one generally above the other and above a ground, a wave-translating means, and means coupling said first and said second antenna means to said wave-translating means, said coupling means including means coupling said first antenna means to said wave-translating means in a first energy transfer relation and means coupling said second antenna means to said wave-translating means in a second energy transfer relation, said first and said second energy transfer relations being of substantially opposite phase and of such magnitude with respect to each other that the combined characteristic of both said antenna means is of the general form of the function $$[\cos \theta_0 - \cos(k\theta + \theta_0)]$$

where $\theta$ is the elevation angle, and $k$ and $\theta_0$ are constants, $\theta_0$ being between $+20°$ and $-20°$.

14. Glide path antenna apparatus suitable for instrument landing of aircraft, comprising a first antenna means and a second antenna means disposed one generally above the other, a wave-translating means operating at a predetermined carrier frequency, means coupling said first antenna means and said second antenna means to said wave-translating means in respect of a first signal at said carrier frequency, a further means coupling substantially only said first antenna means to said wave-translating means in respect of a second signal at said carrier frequency.

15. Glide path antenna apparatus according to claim 14, wherein said wave-translating means includes keying means, said first-mentioned coupling means being responsive to said keying means to couple said first antenna means and said second antenna means to said wave-translating means in respect of said first signal, said further coupling means being responsive to said keying means to couple substantially only said first antenna means to said wave-translating means in respect of said second signal.

16. Glide path antenna apparatus according to claim 14, wherein said first-mentioned coupling means includes modulating means operating in accordance with said first signal, and wherein said further coupling means includes modulating means operating in accordance with said second signal.

CHESTER B. WATTS, JR.